(12) United States Patent
Stoltenjohannes

(10) Patent No.: US 10,012,215 B2
(45) Date of Patent: Jul. 3, 2018

(54) METHOD FOR MEASURING A ROTOR-BLADE ANGLE

(71) Applicant: Wobben Properties GmbH, Aurich (DE)

(72) Inventor: Jürgen Stoltenjohannes, Aurich (DE)

(73) Assignee: Wobben Properties GmbH, Aurich (DE)

( * ) Notice: Subject to any disclaimer, the term of this patent is extended or adjusted under 35 U.S.C. 154(b) by 271 days.

(21) Appl. No.: 14/762,664

(22) PCT Filed: Jan. 3, 2014

(86) PCT No.: PCT/EP2014/050058
§ 371 (c)(1),
(2) Date: Jul. 22, 2015

(87) PCT Pub. No.: WO2014/114474
PCT Pub. Date: Jul. 31, 2014

(65) Prior Publication Data
US 2015/0369218 A1    Dec. 24, 2015

(30) Foreign Application Priority Data
Jan. 24, 2013  (DE) .................... 10 2013 201 163

(51) Int. Cl.
*F03D 11/00*  (2006.01)
*F03D 7/02*  (2006.01)
(Continued)

(52) U.S. Cl.
CPC ........ *F03D 11/0091* (2013.01); *F03D 1/0675* (2013.01); *F03D 7/0224* (2013.01);
(Continued)

(58) Field of Classification Search
CPC ....... F03D 17/00; F05B 2270/804–2270/8042; G01B 11/26–11/272
See application file for complete search history.

(56) References Cited

U.S. PATENT DOCUMENTS 7,052,232 B2    5/2006  Wobben
7,883,316 B2 *  2/2011  Kildegaard ............. F03D 7/042
                                                 416/1
(Continued)

FOREIGN PATENT DOCUMENTS

CN    101622447 A    1/2010
CN    102434403 A    5/2012
(Continued)

*Primary Examiner* — Tri Ton
*Assistant Examiner* — Rufus Phillips
(74) *Attorney, Agent, or Firm* — Seed Intellectual Property Law Group LLP

(57) ABSTRACT

The invention relates to a method for capturing a blade angle of a rotor blade of a rotor of a wind turbine, comprising the steps disposing and aligning a contactless measuring device in front of the wind turbine, aligning the wind turbine in its azimuth position in relation to the measuring device, rotating the rotor of the wind turbine, sampling and capturing the profile of the rotor blade, or a part thereof, at a predefined height, by means of the contactless measuring device, and determining the blade angle of the rotor blade from the data recorded during the sampling of the profile.

16 Claims, 2 Drawing Sheets

(51) Int. Cl.
  *F03D 1/06* (2006.01)
  *G01B 11/26* (2006.01)
  *F03D 17/00* (2016.01)

(52) U.S. Cl.
  CPC .............. *F03D 17/00* (2016.05); *G01B 11/26* (2013.01); *F05B 2270/328* (2013.01); *F05B 2270/804* (2013.01); *Y02E 10/721* (2013.01); *Y02E 10/723* (2013.01)

(56) References Cited

U.S. PATENT DOCUMENTS

| | | | | |
|---|---|---|---|---|
| 8,270,667 | B2* | 9/2012 | Fritz | .................. F03D 80/50 382/100 |
| 8,319,361 | B2 | 11/2012 | Lucks | |
| 2002/0067274 | A1* | 6/2002 | Haller | .................. F03D 17/00 340/601 |
| 2006/0140764 | A1* | 6/2006 | Smith | .................. F03D 7/0224 416/103 |
| 2008/0206052 | A1* | 8/2008 | Volkmer | .................. F03D 17/00 416/61 |
| 2009/0263246 | A1* | 10/2009 | Bolz | ...................... F03D 7/042 416/61 |
| 2009/0266160 | A1 | 10/2009 | Jeffrey et al. | |
| 2011/0206511 | A1* | 8/2011 | Frydendal | ............. F03D 7/0224 416/61 |
| 2012/0128488 | A1* | 5/2012 | Kristoffersen | ........ F03D 7/0224 416/31 |
| 2012/0200699 | A1 | 8/2012 | Bunge | |

FOREIGN PATENT DOCUMENTS

| | | |
|---|---|---|
| DE | 296 09 242 U1 | 8/1996 |
| DE | 100 32 314 C1 | 12/2001 |
| DE | 10 2011 053 968 A1 | 3/2012 |
| DE | 10 2011 112 627 A1 | 3/2013 |
| RU | 30874 U1 | 7/2003 |
| WO | 2011/161058 A1 | 12/2011 |

* cited by examiner

METHOD FOR MEASURING A ROTOR-BLADE ANGLE

BACKGROUND

Technical Field

The present invention relates to a method for capturing a blade angle of a rotor blade of a rotor of a wind turbine. The present invention additionally relates to a measuring arrangement for capturing a blade angle of a rotor blade of a rotor of a wind turbine.

Description of the Related Art

The present invention is based, in particular, on a so-called horizontal-axis wind turbine having at least one, in particular three, adjustable rotor blades. These rotor blades can be adjusted in respect of their angle, and consequently their angle of attack, in relation to the wind, in order to extract from the wind a power that is as optimal as possible, or in order to reduce or limit the power extracted from the wind, in particular in the case of high wind speeds. In adjusting the angle of the rotor blade, which is also referred to as a pitching, the adjusting unit, in principle, can capture the current blade angle, which term is synonymous here with the term rotor-blade angle. This presupposes, however, that the actually existing rotor-blade angle is first equalized with the angle assumed by the adjusting unit. For this purpose, it is necessary to capture the actual rotor-blade angle, i.e., the actual position of the rotor blade. It might also be necessary to subsequently repeat or correct such an equalization.

In particular, it may happen that, in the case of three rotor blades, one is at an incorrect angle, namely, at an angle different from that of the other two rotor blades, and is therefore also at an angle different from that assumed by the adjusting unit. This angular variance is then persistently present, because the further adjustment of the rotor blades always starts from the incorrect angle, i.e., starts from one same angle for all three rotor blades, although one angle is different. Apart from a reduced efficiency because of the incorrect angle, this may also result in uneven loads on the rotor blades. As a result, in particular, any bearings are also subjected to asymmetric loading, in particular in respect of a rotation axis. Besides the unfavorable efficiency, therefore, there may be increased wear.

In connection with this, the German patent DE 100 323 14 C1, which also published as U.S. Pat. No. 7,052,232, proposes measurement of a distance between the tower of the wind turbine and a rotor blade rotating past the tower. In the case of this distance measurement by means of a laser distance sensor, the distance of the rotor blade as it rotates past, and consequently the contour of the rotor blade, is captured in a quasi-continuous manner. The laser distance measuring device is accordingly disposed on the tower, and can therefore perform this distance measurement and, consequently, can effect captures of the contour of the rotor blade as it rotates past.

The known profile and the captured contour of the rotor blade can then be used to determine the actual angle of the rotor blade. Such a measurement is performed for all rotor blades of the wind turbine, with no intermediate adjustment of the rotor blades being effected, such that all angles of these rotor blades can then be compared and adapted. This avoids the setting of differing blade angles.

In the case of this measurement, however, the angle captured by measurement of the distance is also influenced overall by the alignment of the wind turbine, namely, the so-called azimuth alignment of the wind turbine. If this alignment of the wind turbine, namely, in particular, the alignment of the nacelle of the wind turbine, which carries the rotor, or the alignment of the rotor axis, differs from the alignment of the laser distance sensor, that also alters the captured rotor-blade angle. However, the error that results from this is systematically the same for all rotor blades of the wind turbine, if the azimuth position remains unchanged during the measurement. Therefore, the rotor blades can thus nevertheless be equalized with each other.

Moreover, the patent describes that, in the case of a known angle between a laser beam and the hub, it is also possible to determine a "true" blade angle.

Such a determination of the angle between the hub and a measuring sensor can be difficult, however, at least if this measurement has to be highly accurate. Increased accuracy can be achieved for the measurement of the blade angle, i.e., for the measurement of the distance in relation to the blade, for the purpose of sampling the contour, by repeating the measurement, or measurements, of all rotor blades. This, however, only makes it possible to increase the accuracy of the blade angles of the rotor blades in relation to each other. In other words, in this case a relative blade angle can be captured, and only the accuracy of the latter can be increased. A relative blade angle is to be understood to mean the blade angle in relation to the other rotor blades. Capture of an absolute blade angle thus remains problematic, at least in respect of accuracy.

In the priority application relating to the present application, the German Patent and Trade Mark Office has searched the following prior art: DE 10 2011 053 968 A1.

BRIEF SUMMARY

One or more embodiments of the present invention may address at least one of the problems mentioned above. In one embodiment, a solution is to be proposed for capturing an absolute blade position as accurately as possible. At least, an alternative embodiment is to be created.

Proposed according to the invention is a method for capturing a blade angle of a rotor blade of a rotor of a wind turbine. This method is therefore provided to capture an absolute blade angle for each rotor blade. In this case, the absolute blade angle denotes the angle of the rotor blade in relation to the blade hub, to which the rotor blade is attached. The rotor hub thus constitutes the reference basis for the respective blade angle.

In principle, the accurate capturing of the blade angle, which is proposed here, can be used for wind turbines having a fixed or variable rotor-blade angle. The method can also be used for wind turbines whose rotor blades are adjusted individually.

It is therefore proposed that a contactless measuring device be first disposed in front of the wind turbine and aligned, accordingly, to the wind turbine. In a subsequent step, the wind turbine is aligned in its azimuth position in relation to the measuring device. The nacelle, on which the rotor is rotatably mounted, is thus aligned in its azimuth position. This alignment is effected, in particular, such that the rotor plane is aligned perpendicularly in relation to the optical axis between the measuring device and the wind turbine, in particular a mid-point of the tower or mast of the wind turbine. The rotor plane in this case is the plane in which the rotor blades move or, at least, the plane in which the blade tips of the rotor blades move, if it is the case that the rotor blades do not move exactly in a plane because of bending and/or tilting. This right angle between the rotor plane and an optical axis is also to be understood in the sense of a plan view. A vertical rotor plane is assumed in this case.

Alternatively, if the rotor plane is slightly slanted, due to the rotor axis not being exactly horizontal, but at a slight slant, a straight line in the rotor plane may be considered.

If the wind turbine is then aligned in this sense in relation to the measuring device, namely, in particular, as exactly as possible, the rotor can be rotated about its rotor axis for the purpose of measurement. In this case, the profile of the rotor blade is then sampled and captured, by means of the measuring device, at a predefined height, i.e., at a predefined axial position of the rotor blade. The sampling in this case is effected such that a distance from the measuring device to the rotor blade is measured continuously. The alignment of the measuring device remains constant in this case. Consequently, the profile of the rotor blade results in a change in the distance in relation to the measuring device, and this change in distance thus represents the profile of the rotor blade at the corresponding position, or height. In this case, it is not the entire profile of the rotor blade that is captured at the position concerned, but only the side of the rotor blade that faces towards the measuring device. This, however, is sufficient to determine, in particular to calculate, the blade angle therefrom, given knowledge of the known profile of the installed rotor blade.

Preferably, the wind turbine is aligned in its azimuth position such that a distance measurement of a rotor blade is effected in a first and in a second position with a constant azimuth setting, the rotor blade in the first position being opposite the second position. The first and the second position are thus basically mirror-symmetrical in relation to each other, in the case of a vertical mirror plane of symmetry. For example, the first position may be a 5-o'clock position, and the second a 7-o'clock position, or vice versa. Likewise possible for the first and the second position, or vice versa, are a 4-o'clock position and an 8-o'clock position. Another example that may be given is a 2-o'clock position and a 10-o'clock position. These are merely examples and, preferably, a 3-o'clock position and a 9-o'clock position are proposed, namely that, for alignment of the wind turbine, the rotor blade is horizontal in each of the two positions. A distance measurement is thus performed, from the measuring device to a predefined point on the rotor blade, when the latter is in the first position. The rotor blade is then moved into the opposite position, i.e., the second position, by rotating the rotor. A second distance measurement is then performed, from the measuring device to the predefined point on the rotor blade, which is now in the second position. If the two distance measurements produce the same value, this means that the rotor plane is positioned transversely in relation to the optical axis of the measuring device in relation to the tower. The wind turbine is then aligned, in its azimuth position, exactly to the measuring device, the azimuth position is then not altered for the subsequent measurement, and the wind turbine is thus fixed in this azimuth position. The rotor is then rotated in order then to sample the at least one blade, or the blades, for the purpose of measuring the profile and determining the angle. This angle is then the absolute angle, because there is no azimuth adjustment, and therefore there is also no need to take the latter out of the calculation. Accordingly, it is then also possible to perform an equalization, by means of any setting devices, for the purpose of adjusting each rotor blade in respect of its angle of attack. Finally, the setting device of each rotor blade, if such a setting device is present, can accordingly set the correct angle of the rotor blade.

Preferably, the predefined point on the rotor blade, towards which the distance measurement for aligning the wind turbine is performed, is located approximately in the center of the rotor blade, in the axial direction of the blade, in particular in a range from approximately 40 to 60% of the length of the rotor blade, as measured from its root region at the hub to its blade tip.

This makes it possible to achieve a high degree of alignment accuracy, because there is a very large distance between this predefined point when in the first position and the same predefined point when in the second position, and consequently even a small azimuth adjustment, as a small azimuth angle, results in a large change in distance at this predefined point in each case. At the same time, this avoids having such a measurement point positioned too close to the tip of the rotor blade, in order to preclude, or at least keep within narrow limits, any inaccuracies resulting from bending of the rotor blade. It is taken into account in this case that any, even if slight, bending of the rotor blade is most apparent, as a deflection of the rotor blade, in the region of the tip. For a point disposed approximately in the center of the rotor blade, in the axial direction, any deflection here can be disregarded.

According to one embodiment, it is proposed that the sampling be effected on one or more profile sections of the respective rotor blade. The rotor blade is therefore sampled at least at one axial position, namely, transversely in relation to the axial extent of the rotor blade. This is understood to mean the sampling of a profile section, since, because of this sampling transversely in relation to the longitudinal extent of the rotor blade at this location, a section of the rotor blade at this location is captured that shows the profile of the rotor blade in this section, this being designated as a profile section. In addition to the sampling of a profile section, a further profile section may be sampled, at a different axial position on the rotor blade, in order thereby to minimize any errors. Preferably, two, three or more profile sections of the respective rotor blade are sampled. The sampling in this case is performed on the same profile section, respectively, of each rotor blade of the wind turbine.

An advantageous design proposes that the measuring device be disposed at a distance from the wind turbine. Preferably, an optical measuring device, in particular a laser measuring device, is used. The measuring device is disposed at a distance from the wind turbine, e.g., relative to the foot of the tower of the wind turbine, that corresponds at least to the height of the wind turbine. The height of the wind turbine is understood here to mean the height of the rotor axis above the ground. If it is the case that the rotor axis is at a slight slant, the height of the rotor axis in the region of the rotor hub is preferably taken as the basis. It is advantageous to select, as the distance, at least twice the height of the wind turbine, and more preferable for at least three times the height of the wind turbine to be selected as the distance. This has the result that the course of the optical axis from the measuring device is not too steep, and is therefore at a favorable angle in relation to the rotor blade to be sampled in each case.

Advantageously, the measuring device for sampling of the rotor blade for the purpose of capturing the profile of the rotor blade is performed with the same measuring device that was used previously for aligning the wind turbine in its azimuth position. This measuring device for distance measurement can thus be used both to sample the rotor blade and to align the wind turbine.

Preferably, the operation of sampling and capturing the profile of the rotor blade, or a part thereof, is performed while the rotor is rotating, in particular while the rotor blade concerned passes in front of the tower because of the rotation of the rotor, a continuous distance measurement, in particular, being effected for the purpose of capturing the profile, or a part thereof. During sampling, therefore, the measuring device can be aligned to a point, and this alignment can be maintained during the measurement. The rotor blade then basically rotates past the measuring device, or past the fixed measuring point, thus enabling the sampling to be effected along the profile section. A preferred measurement, in a position in which the rotor blade passes in front of the tower because of the rotation of the rotor, thus results in measurement being effected substantially when the rotor blade is vertical, whereby a particularly favorable angle is obtained in relation to a measuring device disposed on the ground in front of the wind turbine. Moreover, in this position, there is the least amount of wind to be taken into account, because the rotor blade is down at the bottom, and because the tower itself creates a certain wind shadow, or reduction in wind, to the front. A continuous measurement can then be performed by means of the measuring device, in order to measure the profile as accurately as possible and thus enable the designated rotor-blade angle to be calculated as accurately as possible. Preferably, digital measurement and/or digital evaluation are/is performed, and to this extent a continuous measurement is also understood to mean a measurement that samples at a high sampling rate. To this extent, a continuous measurement also includes a digital measurement.

Preferably, the aligning of the wind turbine in its azimuth position is effected iteratively. For this purpose, a distance measurement of a rotor blade in the first position and of the rotor blade in the second position is first performed, with a constant azimuth setting. The azimuth setting in this case is fixed, or at least monitoring is effected to ensure that there is no change in the azimuth position and that the azimuth position is the same for both positions.

In the next step, the wind turbine is then adjusted in its azimuth position if the distances of the two positions in relation to the measuring device were different. The distance measurement and adjustment then continue to be repeated until the distances of the two positions are equal, which also includes the case that the variances are below a tolerance limit. It is pointed out that, in principle, the measurement of the two position can also be performed using differing rotor blades for the purpose of aligning the wind turbine. In this case, for example, the measurement could be effected without rotation of the rotor if, for example, one rotor blade is in the 4-o'clock position and the other rotor blade is in the 8-o'clock position, if a rotor having three rotor blades is being examined. In this case, however, there is the problem of ensuring that measurement is actually effected at the same point on each of the two rotor blades, in particular at the same axial position of the rotor blade. One possibility for solving this problem would be to indicate in advance, e.g., prior to installation of the rotor blades, one or more such distance measurement points on the rotor blade, or at least to provide marking such that the measuring device can identify such a point. The distance measurement could then be performed without rotation of the rotor.

According to an advantageous embodiment, it is proposed that the capturing of the blade angle be performed while the wind turbine is operated in a working point and/or operating range that does not effect a blade adjustment, in particular that the wind turbine in this case be operated under partial load.

An operating range is understood to mean, in particular, a rotational-speed range and/or output range.

Preferably, the capturing of the blade angle is effected while the wind turbine is operated in a working point and/or operating range, wherein, here, in the case of a wind turbine that can set the rotor-blade angle, a working point, or operating region, is selected in which no blade adjustment is performed, in particular the wind turbine is operated in this case at such low wind speeds that it operates in a partial load range. The measurement is thereby easily effected in any case after the wind turbine has been aligned in its azimuth position, while the rotor rotates, driven by the wind. Alternatively, it is proposed that the rotor be rotated selectively, in that the generator of the wind turbine is operated in a motor-driven manner.

Also proposed according to the invention is a measuring arrangement for capturing a blade angle of one or more rotor blades of a rotor of a wind turbine. Such a measuring arrangement, in addition to comprising the wind turbine, comprises a measuring device, in particular an optical measuring device, which is positioned on the ground in front of the wind turbine and aligned. The measuring arrangement is configured to execute at least one method according to one of the previously explained embodiments.

For the purpose of aligning the measuring device, in particular also for the purpose of aligning the measuring device to effect the described alignment of the wind turbine in its azimuth position, the measuring arrangement, in particular the measuring device, comprises, according to one embodiment, an optical sight, which enables selective alignment to a specific point on the rotor blade, in a predefined position. In particular, such an optical sight is prepared, and is suitable, for aligning the measuring device to a marking on the rotor blade, while the rotor blade is stopped.

BRIEF DESCRIPTION OF THE SEVERAL VIEWS OF THE DRAWINGS

The invention is explained exemplarily in greater detail in the following, on the basis of exemplary embodiments and with reference to the accompanying figures.

DETAILED DESCRIPTION

Figure 1:
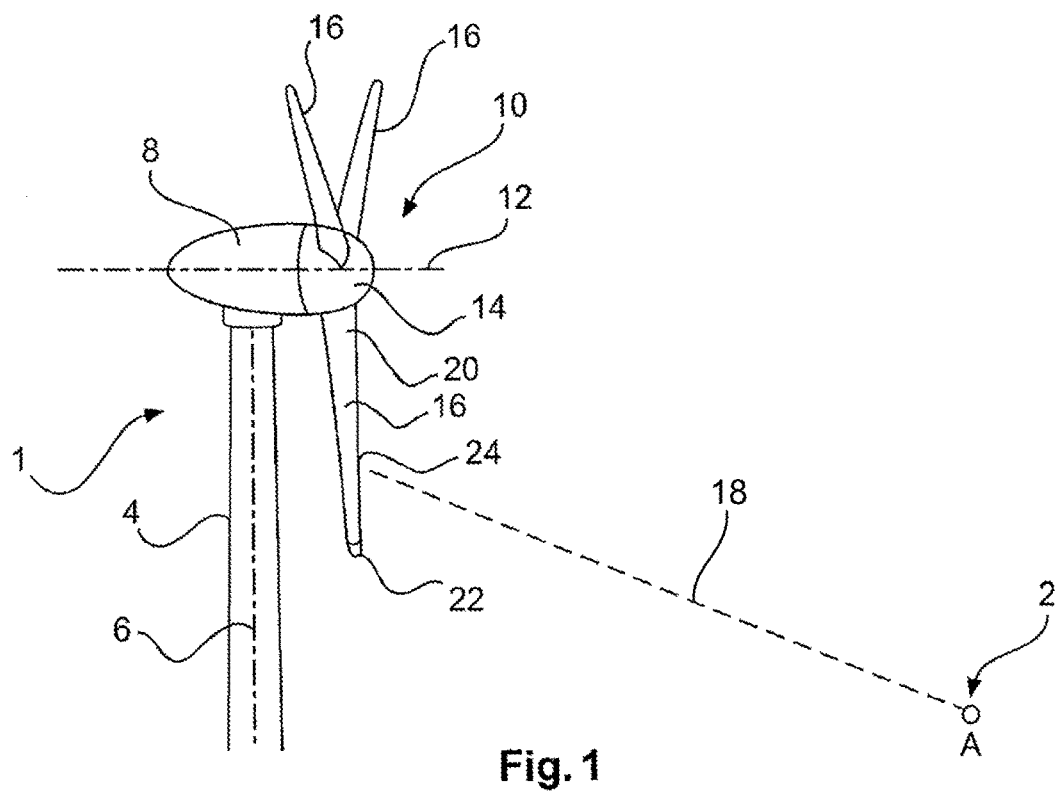
FIG. 1 shows a measuring arrangement comprising a wind turbine and a measuring device.

FIG. 1, in a schematic side view, shows a wind turbine 1 and a measuring device 2, which together substantially constitute a measuring arrangement of an embodiment. The wind turbine 1 has a tower 4, which has a tower center axis 6, and disposed on which there is a nacelle 8 that comprises a rotor 10. The rotor 10 is mounted so as to be rotatable about a rotor axis 12, which is substantially horizontal. The rotor 10 in this case has a hub comprising a spinner 14, on which three rotor blades 16 are disposed. One rotor blade points downwards, and is thus in the 6-o'clock position, and the two other rotor blades 16 point obliquely upwards, and are in the 10-o'clock and 2-o'clock positions, respectively.

The measuring device 2 is aligned approximately to a central region of the lower rotor blade 16, as indicated by an optical line 18, which also represents a laser beam for performing an optical measurement on the rotor blade 16. The measuring device 2 in this case is on the ground, in front of the wind turbine, at a distance of approximately twice the height of the wind turbine 1, relative to the rotor axis 12.

As indicated only for the lower rotor blade 16 in FIG. 1, the rotor blades 16 each have a blade root 20, for attachment to the hub, or spinner, 14, and a blade tip 22. FIG. 1 shows the arrangement of three rotor blades 16, wherein, for the purpose of illustration, the two rotor blades 16 represented at the top are also depicted as being somewhat slanted in relation to each other, in order to render them more visible. In the case of an exact side view of the wind turbine 1, and consequently of the rotor 10, only one rotor blade would be visible at the top.

Figure 2:
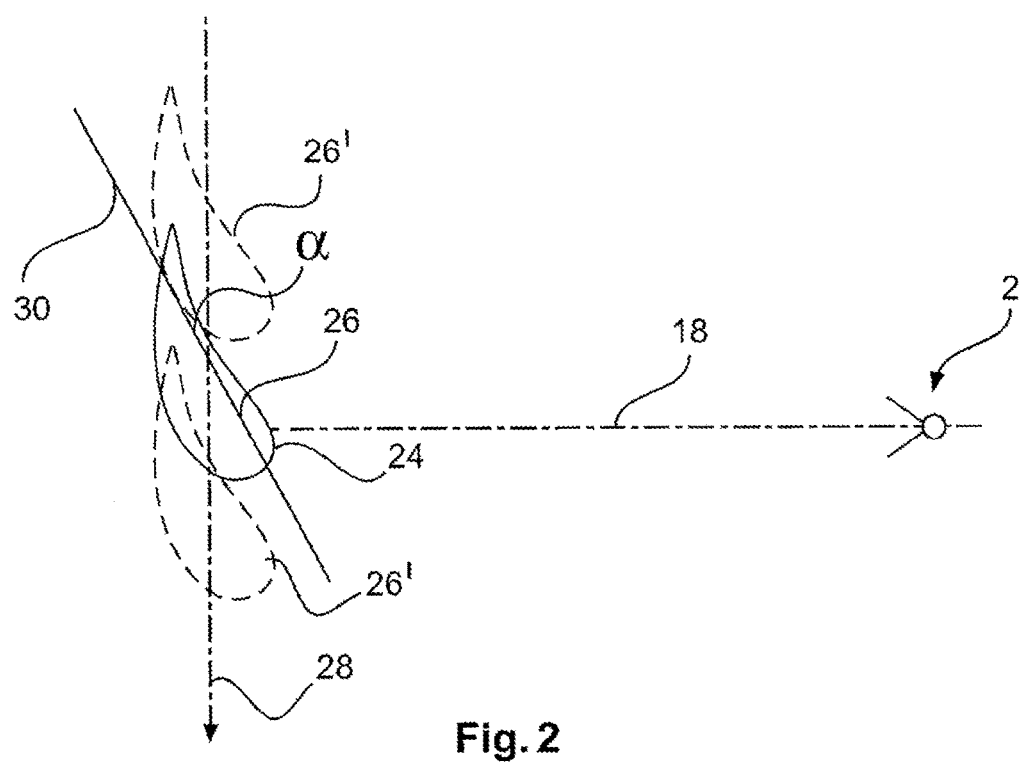
FIG. 2 shows, schematically, the sampling of a profile section of a rotor blade as the rotor blade is moving.

FIG. 2, as a representation of principle, shows a plan view of a profile section 26 of a rotor blade 16, as a view from above in respect of the arrangement of FIG. 1. For greater clarity, however, differing size ratios have been selected for FIG. 2 and FIG. 1. The profile section in this case is taken, at a position on the longitudinal axis of the rotor blade 16, at the level of a sampling point 24 that, for the purpose of illustration, is also indicated in FIG. 1, namely, the point at which the optical line 18, or a laser beam 18 for sampling, meets the rotor blade 16.

FIG. 2 also shows two profile sections 26', represented by broken lines, which shows the profile section 26, and thus the rotor blade 16, at differing positions, owing to a motion of the rotor blade 16. A direction of motion 28 is indicated in this case. By definition, the direction of motion 28 lies in the rotor plane of the rotor 10.

The optical line 18 is perpendicular to the direction of motion 28.

Owing to the motion of the rotor blade 16, the measuring device 2 can thus sample the profile section 26, at least the side of the profile section 26 facing towards the measuring device 2. This part of the profile section 26 is thus captured, and thus the position of the profile section 26, and thus of the rotor blade 16, in relation to the direction of motion 28, and thus in relation to the rotor plane, is captured.

An alignment 30, which may be, for example, the chord of the profile section 26, is assigned to the profile section 26, or to the rotor blade 16, in this case. To this extent, the chord 30 is used exemplarily here, for the purpose of explanation, although a straight line may also be defined as an alignment. The position of the profile section, and thus the position of the alignment 30, namely the chord 30, is therefore known, namely relative to the rotor plane, or the direction of motion 28, from the sampled profile section 26, or from the sampled part thereof. This may be indicated by the angle α, which is shown here as an angle between the direction of motion 28 and the alignment 30, or chord 30.

The determination of the blade angle α, i.e., the angle between the alignment 30 and the direction of motion 28, and thus the angle between the alignment 30, or chord 30, and the rotor plane, is calculated here on the assumption that the optical line 18 is perpendicular to the rotor plane, or perpendicular to the direction of motion 28 according to the view of FIG. 2.

Figure 3:
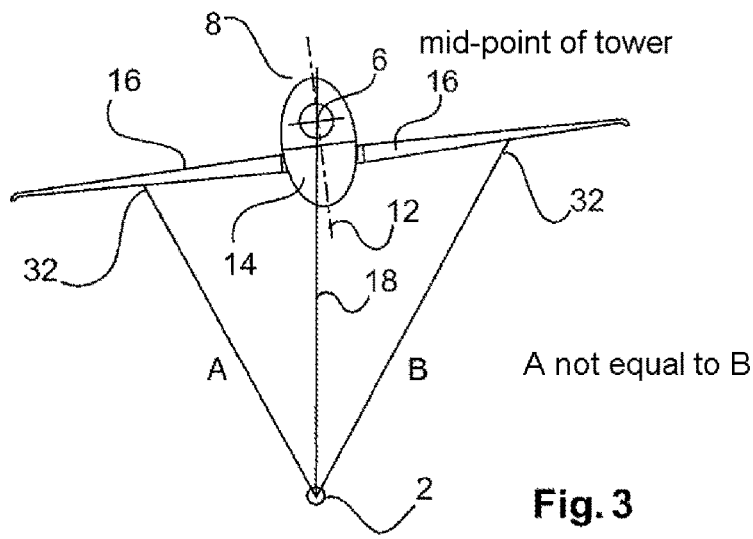
FIG. 3 shows, schematically, a wind turbine not aligned in the azimuth position.
Figure 4:
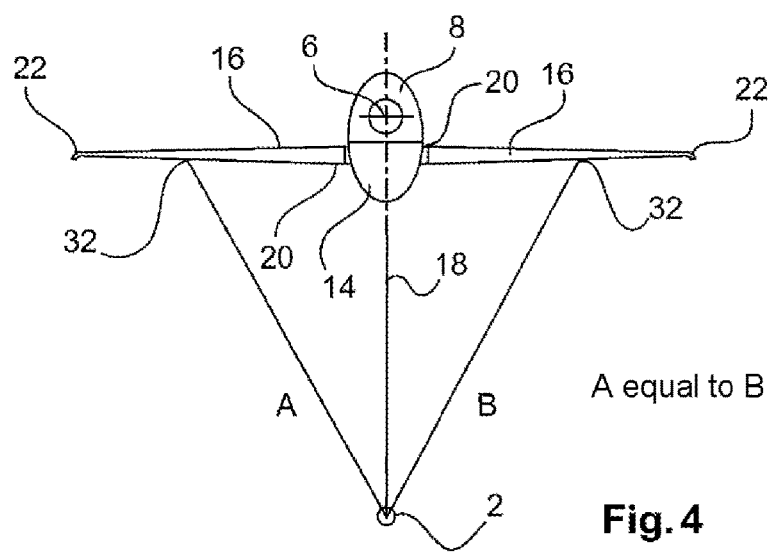
FIG. 4 shows a wind turbine aligned in its azimuth position.

This requires an alignment that can likewise be performed by means of the measuring device 2, as explained by FIGS. 3 and 4. For this, FIG. 3, in a plan view, shows a nacelle 8 that has not yet been aligned in its azimuth position. For the purpose of capture, and ultimately to perform the alignment, the measuring device 2 in each case captures a distance in relation to the rotor blade 16, namely, in each case, when the rotor blade 16 is in a horizontal position. In the case of the position of the rotor blade 16 shown on the left, which may be designated as a first position, a distance A in relation to the measuring device 2 is measured to a measuring point 32 on the rotor blade 16. When the rotor blade 16 is in the horizontal position on the right, which may be designated as a second position, a distance B is measured to the same measuring point 32.

It is clearly evident from FIG. 3 that the distance B is greater than the distance A. Accordingly, the nacelle must be adjusted in its azimuth position. The rotor plane, which may also be designated as a rotor-blade plane, is therefore not yet perpendicular to the optical line 18.

Purely by way of precaution, it is pointed out here that, although the same references are used between FIGS. 1 to 5, the elements or size ratios that are present or shown are not always exactly the same. The figures are for the purpose of illustration.

FIG. 4 shows basically the same situation as in FIG. 3, except that the distances A and B are now equal (and, to that extent, A and B in FIG. 4 are not identical in value to the distances A and B of FIG. 3). The wind turbine, namely the nacelle 8, is now aligned in its azimuth position to the measuring device 2, and the rotor plane is perpendicular to the optical line 18. Thus, according to the plan view of FIG. 4, the optical line 18 and the rotor axis 12 are coincident. The azimuth position can now be stopped, in particular fixed, and the sampling of the rotor blade 16, explained with reference to FIGS. 1 and 2, can now be performed.

Figure 5:
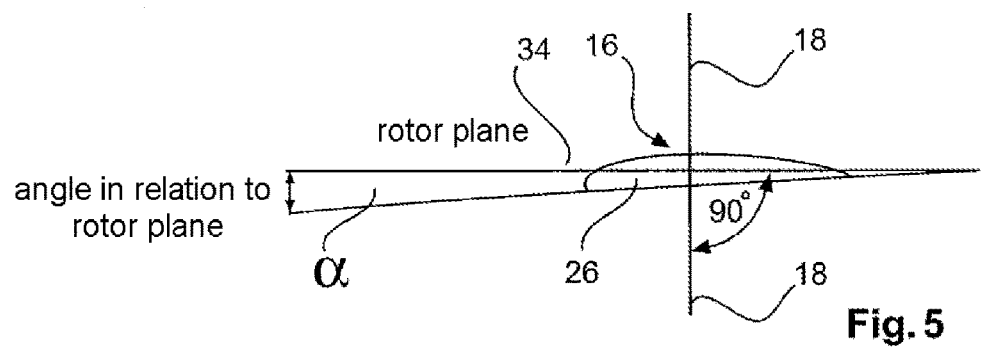
FIG. 5 illustrates, in a plan view, angles that are relevant according to the invention.

FIG. 5 explains the alignment between the optical axis 18 and the rotor plane 34, in respect of a plan view according to FIG. 4. There is therefore a right angle between the rotor plane 34 and the optical line 18. Purely by way of precaution, it is pointed out that, clearly, in a side view, such as that shown by FIG. 1, there does not have to be a right angle between the optical line 18 and the rotor plane. Usually, there will also not be a right angle here, unless the measuring device 2 is disposed in such a high position that the optical line, i.e., in particular a laser beam, meets the rotor plane 34 completely perpendicularly.

The captured angle α of the rotor blade 16, or of the profile section 26, in relation to the rotor plane 34 can therefore be determined if a 90 degree angle is maintained between the optical line 18 and the rotor plane 34.

Otherwise, for the purpose of determining a position, or a relative angle, of the rotor blade from a sampling of its surface, or of the profile section, reference is made to U.S. Pat. No. 7,052,232. Although the latter describes the calculation of an angle from the sampled profile, it is now proposed that an absolute blade angle α, which goes beyond the specifications of a relative angle in relation to the other rotor blades, be determined on the basis of an azimuth alignment that is exact as possible. For this purpose, a ground-based measuring system is proposed, in particular a ground-based measuring device 2, that is precisely aligned to the wind turbine, namely, in particular, to the mid-point of the tower. In addition, a precise azimuth alignment of the wind turbine is proposed, such that the absolute blade angle α can then be determined from the measurement performed. The proposed alignment of the nacelle in its azimuth position is not dependent in this case on any position values from the azimuth adjustment system that, if available at all, are subject to error, but proposes an advantageous system and method that can be executed in an exact manner and that can use the ground-based measuring sensor, or the ground-based measuring device.

The invention claimed is:

1. A method for capturing a blade angle of a rotor blade of a rotor of a wind turbine, the method comprising:
disposing and aligning a contactless measuring device in front of the wind turbine;

aligning an azimuth position of the wind turbine in relation to the contactless measuring device by performing distance measurements of a rotor blade while the rotor blade is in a first position and in a second position with a constant azimuth setting, wherein the rotor blade in the first position is opposite the second position;

rotating the rotor of the wind turbine;

using the contactless measuring device, sampling and recording data indicative of at least a portion of the profile of the rotor blade at a predefined height; and determining a blade angle of the rotor blade using the recorded data.

2. The method according to claim 1, wherein as the azimuth position of the wind turbine is being aligned, the rotor blade is approximately horizontal in the first position and in a 9-o'clock position.

3. The method according to claim 1, wherein the contactless measuring device is an optical measuring device, and sampling at least a portion of the profile of the rotor blade is performed optically by the optical measuring device.

4. The method according to claim 1, wherein the sampling is performed on one or more profile sections of the rotor blade.

5. The method according to claim 1, wherein the contactless measuring device is disposed at a distance from the wind turbine.

6. The method according to claim 1, wherein the sampling is performed while the rotor is rotating.

7. The method according to claim 1, wherein aligning the azimuth position of the wind turbine is performed iteratively, wherein aligning comprises:

with a constant azimuth setting, measuring first and second distance measurements of a rotor blade in the first position and of the rotor blade in the second position; and comparing the first and second distance measurements;

when the first and second distance measurements are different, adjusting the azimuth position; and repeating the measuring, comparing, and adjusting until the distances of the first and second distance measurements are equal.

8. The method according to claim 1, wherein the method is performed while the wind turbine is operating.

9. The method according to claim 2, wherein the first position is a 3 o'clock position and the second position is a 9 o'clock position.

10. The method according to claim 3, wherein the optical measuring device is a laser measuring device.

11. The method according to claim 5, wherein the contactless measuring device is disposed at a distance that is greater than a height of the wind turbine.

12. The method according to claim 11, wherein the distance is at least twice the height of the wind turbine.

13. The method according to claim 6, wherein the sampling is performed while the rotor blade passes in front of a tower of the wind turbine.

14. The method according to claim 8, wherein the sampling is performed while the rotor blade passes in front of a tower of the wind turbine.

15. The method according to claim 8 wherein the wind turbine is operated under partial load.

16. A method for capturing a blade angle of a rotor blade of a rotor of a wind turbine, the method comprising:

disposing and aligning a contactless measuring device in front of the wind turbine;

aligning an azimuth position of the wind turbine in relation to the contactless measuring device;

rotating the rotor of the wind turbine;

using the contactless measuring device, sampling and recording data indicative of at least a portion of the profile of the rotor blade at a predefined height; and determining a blade angle of the rotor blade using the recorded data, wherein aligning the azimuth position of the wind turbine is performed iteratively, wherein aligning comprises:

with a constant azimuth setting, measuring first and second distance measurements of a rotor blade in the first position and of the rotor blade in the second position; and comparing the first and second distance measurements;

when the first and second distance measurements are different, adjusting the azimuth position; and repeating the measuring, comparing, and adjusting until the distances of the first and second distance measurements are equal.

* * * * *